(12) United States Patent
Limacher et al.

(10) Patent No.: US 8,683,874 B2
(45) Date of Patent: Apr. 1, 2014

(54) VORTEX FLOW MEASURING DEVICE FOR MONITORING AND/OR MEASURING FLOW OF DISTRIBUTED PARTICLES AND/OR DROPLETS

(75) Inventors: Peter Limacher, Aaran Rohr (CH); Dirk Sutterlin, Schopfheim (DE); Rainer Hocker, Waldshut (DE); Christoph Gossweiler, Winterthur (CH)

(73) Assignee: Endress + Hauser Flowtec AG, Reinach (CH)

( * ) Notice: Subject to any disclaimer, the term of this patent is extended or adjusted under 35 U.S.C. 154(b) by 214 days.

(21) Appl. No.: 13/255,452

(22) PCT Filed: Mar. 9, 2010

(86) PCT No.: PCT/EP2010/052979
§ 371 (c)(1),
(2), (4) Date: Sep. 8, 2011

(87) PCT Pub. No.: WO2010/103003
PCT Pub. Date: Sep. 16, 2010

(65) Prior Publication Data
US 2011/0314934 A1  Dec. 29, 2011

(30) Foreign Application Priority Data

Mar. 12, 2009 (DE) .......................... 10 2009 001 526

(51) Int. Cl.
*G01F 1/32* (2006.01)
(52) U.S. Cl.
USPC ...................................................... 73/861.24
(58) Field of Classification Search
USPC ............... 73/861.24, 861.26, 861.18, 861.19, 73/861.21, 861.22, 861.23
See application file for complete search history.

(56) References Cited

U.S. PATENT DOCUMENTS

| 2,869,366 A | 1/1959 | Nitikman |
| 3,650,152 A | 3/1972 | White |

(Continued)

FOREIGN PATENT DOCUMENTS

| WO | WO 03/062757 | 7/2003 |
| WO | WO 2004/038344 | 5/2004 |

(Continued)

OTHER PUBLICATIONS

German Search Report in corresponding German Application No. 10 2009 001 526.4, Dec. 3, 2009.

(Continued)

*Primary Examiner* — Jewel V Thompson
(74) *Attorney, Agent, or Firm* — Bacon & Thomas, PLLC (57) ABSTRACT

A vortex flow measuring device for monitoring and/or measuring an, at least at times, two phase medium flowing in a pipeline; wherein the medium has a first phase, especially a gaseous, first phase, with a first density and a second phase, especially a particle or droplet shaped, second phase, having a second density different from the first density; and wherein the vortex flow measuring device has at least a measuring tube, which can be inserted in a pipeline, a bluff body, and a vortex sensor, which responds to pressure fluctuations. The vortex flow measuring device additionally includes an acoustic transducer, which is formed integrally in a component, especially the bluff body, which protrudes into a flow path within the measuring tube, or is acoustically coupled to such component in such a manner that acoustic signals produced by impact of particles and/or droplets of the second phase on the component are transducible to electrical signals by the acoustic transducer.

25 Claims, 2 Drawing Sheets

(56) References Cited

U.S. PATENT DOCUMENTS

| | | | |
|---|---|---|---|
| 4,674,337 A | 6/1987 | Jonas | |
| 5,083,452 A | 1/1992 | Hope | |
| 6,912,918 B1 * | 7/2005 | Lynnworth et al. | 73/861.26 |
| 7,444,885 B2 * | 11/2008 | Keese et al. | 73/861.22 |

FOREIGN PATENT DOCUMENTS

| WO | WO 2007/105961 | 9/2007 |
|---|---|---|
| WO | WO 2009/003963 | 1/2009 |
| WO | WO 2010/103003 | 9/2010 |

OTHER PUBLICATIONS

International Search Report in corresponding International Application No. PCT/EP2010/052979, Sep. 3, 2010.

English translation of the International Preliminary Examination Report, Dec. 3, 2009.

* cited by examiner

VORTEX FLOW MEASURING DEVICE FOR MONITORING AND/OR MEASURING FLOW OF DISTRIBUTED PARTICLES AND/OR DROPLETS

TECHNICAL FIELD

The present invention relates to a vortex flow measuring device as defined in the preamble of claim 1 as well as a method for monitoring and/or measuring a medium flowing in a pipeline and having, at least at times, at least two phases, of which a first phase, especially a gaseous first phase, has a first density and a second phase, especially a phase in the form of particles or droplets, has a second density different from the first density. The method is performed by means of a bluff body protruding into the flowing medium and a vortex sensor placed especially downstream or within the bluff body.

BACKGROUND DISCUSSION

Vortex flow measuring devices are frequently applied for measuring the flow of fluids in pipelines, especially gas flows or vapor flows in a high temperature range. In the case of such vortex flow measuring devices, a flow impediment is arranged in the flow path in such a manner that the fluid can flow past on both sides of the flow impediment. In such a case, vortices form on both sides of the flow impediment. Over a broad range of Reynolds numbers, the vortices, in such a case, form alternately on either side of the flow impediment so that a staggered arrangement of vortices arises. This staggered arrangement of vortices is referred to as a Kármán vortex street. In such vortex flow measuring devices, the principle utilized is that the vortex shedding frequency, with which these vortices are formed, is proportional to the flow velocity of the respective fluid over a broad range of Reynolds numbers. Accordingly, the flow velocity can be determined from the registered vortex shedding frequency of the vortices, which is referred to as vortex frequency in the following, and a characteristic calibration factor for the respective type of vortex flow measuring device.

As a rule, a vortex flow measuring device has, in such a case, a measuring tube, in whose flow path a bluff body is arranged as a flow impediment. In such a case, the bluff body extends preferably in a diametral direction completely or over a considerable part of the inner cross section of the measuring tube in such a manner that the particular fluid can flow past both sides of the bluff body. As a rule in such a case, the bluff body has at least two shedding edges which, in given cases, can also be rounded, on both sides. The shedding edges support a shedding of vortices. Operationally, the measuring tube is applied in a pipeline whose fluid flow is to be measured so that the fluid flows through the measuring tube and at least partially against the bluff body.

Additionally, the vortex flow measuring device, as a rule, comprises at least one vortex sensor, which responds to pressure fluctuations produced by vortices. The vortex sensor is arranged downstream from the two shedding edges. In such case, the vortex sensor can be arranged within the bluff body or downstream from the bluff body, especially as a separate component. The pressure fluctuations registered by the vortex sensor are transduced to an electrical measurement signal, whose frequency is directly proportional to the flow velocity of the fluid. Supplementally, if the density of the fluid is ascertained or known, then the mass flow of the fluid can be calculated from the flow velocity and the density.

Vortex flow measuring devices of the type described are applied, above all, for measuring single phase media, especially fluids (liquids, gases), for example, a flow of steam, or a liquid flow. In special applications, however, it can happen that a second or yet other phases occur within a fluid flow. For the sake of simplicity, the first phase and the second phase of a two or more phase medium flowing in the pipeline is discussed in the following, wherein the first and second phases represent the two main phases with the largest mass flow fractions. Other phases can especially be contained in one or both phases, especially as solid particles. The first and the second phases of the flowing two or more phase medium can each be, in such a case, different aggregate states of the same material, as is the case, for example, in the case of a water rivulet in steam, or also be two different materials, such as, for example, sand entrained in a liquid, etc. Preferably, both the first as well as the second phase are, in each case, a fluid (liquid, gas). The droplet/particle flow can, in such a case, in turn, comprise more than only one substance, especially two different materials. Each of the further developments explained below, even if not explicitly noted each time (by the statement of "at least a second phase"), pertains to this variant. The invention is especially applicable to two phase mixtures, in which the density difference between the two phases is high in such a manner and the two phases do not or only slightly mix, so that the second phase in entrained in the form of particles or droplets by the flow of the first phase.

It is known that, in vortex flow measuring devices, the occurrence of two or more phases leads to errors in the flow velocity ascertained from the vortex frequency.

Fundamentally, there are different ways in which at least a second phase can be carried in a flow of a first phase, such as a gas flow. The at least a second phase can be carried in the flow especially as particles and/or droplets relatively uniformly distributed in the first phase. Additionally, the second phase can also flow as a wall flow, especially as a rivulet, along a tube wall of the relevant pipeline. Both of these types of flow of the second and also third phase can occur, depending on application, in parallel (at least 3 phases) or only individually (at least 2 phases).

An example of the occurrence of two different phases is the occurrence of liquid collections in gas lines. This case is especially relevant in the case of vapor lines (steam lines), in which water can form as the second phase. As mentioned above, the liquid collection in such a case can be carried as a distributed droplet flow in the first phase (here: gas), however, the liquid collection can also flow alternatively or supplementally as a wall flow along a tube or pipe wall of the relevant pipeline. Besides the previously mentioned flow forms, solid bodies, such as sand or larger particles can, for example, also be transported in liquid or gas flows in gas lines. In such a case, the entrained solid bodies, especially when these are finely grained, (mixed with a part of the first phase in given cases) flow as a wall flow along a tube or pipe wall of the respective pipeline. Alternatively or supplementally, the entrained solid bodies can be carried at least partially in the flow of the first phase as a particle flow, which is distributed relatively uniformly over the cross section of the tube.

In such case, it is desirable for many applications to detect the occurrence of a second phase in a flow of a first phase reliably and without essentially increased costs and, in given cases, to also determine the fraction of the second phase, especially its mass flow. This is especially the case in applications in which steam is transported over a long distance. Supplying hot steam in pipelines is utilized in industrial plants especially for providing energy, wherein for this, a high steam quality, which corresponds to a low fraction of liquid water, is required. Especially in such case, it is often required that the steam quality be greater than 95%. The steam quality is given, in such case, as the ratio of the mass flow of the steam fraction to the total mass flow composed of steam and condensed water. Hot steam, which is conveyed in pipelines, is also applied in the field of oil production.

The present invention primarily concerns the problem of providing reliable and near time monitoring and measuring of a particle and/or droplet flow of at least a second phase in a flow of a first phase, especially a gaseous first phase, flowing in a pipeline.

U.S. Pat. No. 4,674,337 describes an apparatus for determining the number and mass of particles, which are carried in a fluid flow of predetermined flow rate. In such case, the apparatus includes an essentially planar impingement area, which is arranged in the fluid flow in such a manner that a predetermined fraction of the particles impacts the impingement area, in each case, at essentially the same angle in such a manner that an accumulation of the particles on the impingement area is prevented. The particles produce, upon impact, acoustic signals, which are proportional to the kinetic energy of the particles. Additionally, the apparatus comprises means to lead the acoustic signals out of the flow as well as means to then transduce the acoustic signals to electrical signals. The electrical signals are then evaluated by electronics in such a manner that an estimate of the total number and mass of the individual particles are obtained therefrom. The detection of particles with an apparatus described in U.S. Pat. No. 4,674,337 requires, in such case, that a separate apparatus is provided, which must be inserted into or installed in a corresponding pipeline. This is associated with increased cost and effort.

SUMMARY OF THE INVENTION

An object of the present invention is to provide a vortex flow measuring device as well as a method to monitor reliably and without considerable cost an at least at times two phase medium flowing in a pipeline; the medium has a first phase, especially a gaseous first phase, with a first density and a second phase, especially a liquid second phase, having a second density different from the first density; wherein the second phase flows mainly in the form of a particle/droplet flow, preferably homogeneously distributed over the cross section of the tube.

According to the present invention a vortex flow measuring device is provided for monitoring and/or measuring an, at least at times, two or more phase medium flowing in a pipeline; wherein the medium has a first phase, especially a gaseous, first phase, with a first density and a second phase, especially a liquid, second phase, distributed as particles and/or droplets in the first phase and having a second density. The vortex flow measuring device comprises at least a measuring tube, which can be inserted in a pipeline, a bluff body and a vortex sensor, which responds to pressure fluctuations; wherein the bluff body extends into the measuring tube transversely to a flow direction in such a manner that a flow path is formed on both sides of the bluff body; and at least two shedding edges are embodied on both sides of the bluff body (8) in such a manner that Kármán vortices are shed on these during use. The vortex sensor, in reference to an installed position, is arranged downstream from the shedding edges. According to the present invention, the vortex flow measuring device additionally comprises an acoustic transducer, which is embodied integrally in a component of the vortex flow measuring device, especially the bluff body, that protrudes into a flow path within the measuring tube, or which is coupled acoustically to such component, in such a manner that acoustic signals produced by impact of particles and/or droplets of the second phase on the component are transducible into electrical signals by the acoustic transducer.

On the basis of these considerations, the present invention enables a vortex flow measuring device, which, while in use, as a rule, can determine the flow velocity of the first phase of a flowable two or more phase medium using a vortex frequency of the Kármán vortices registered by the vortex sensor, also simultaneously to detect the occurrence of at least a second phase in the form of a distributed particle and/or droplet flow near in time (i.e. online). No additional device is required in such case for detecting the second phase in the form of a distributed particle and/or droplet flow. Accordingly, the number of components and, therewith, costs can be kept small.

The detection of a distributed particle and/or droplet flow is achieved when a (present) component of the vortex flow measuring device, which protrudes into a flow path within the measuring tube, is simultaneously utilized as an impingement area for a part of the particle and/or droplet flow within the first phase. Accordingly, a separate component for providing a suitable impingement area is not required, so that costs and structural effort can be kept small. The acoustic signals produced by the impact of particles and/or droplets of the second phase on the component are then transducible to electrical signals by the acoustic transducer, so that these signals are electrically processable or exploitable by the vortex flow measuring device (especially by a correspondingly embodied electronics of the vortex flow measuring device). Detection can occur in such case, for example, by an electronics of the vortex flow measuring device embodied in such a manner that the electronics detects a particle and/or droplet flow of the second phase when a predetermined value limit of the electrical signal or a measured variable derived therefrom is exceeded. In such case, the vortex flow measuring device of the invention additionally enables integration of the acoustic transducer into the sensor arrangement of the vortex sensor and integration of the associated electronics into the (already present) electronics of the vortex flow measuring device, so that further costs can be saved. Additionally, it can be provided that a warning or error report is output in the case of detection of a particle and/or droplet flow and/or an increased particle and/or droplet flow of at least a second phase by the vortex flow measuring device.

In such case, the first phase and the (at least a) second phase can each be different aggregate states of the same material, as is the case, for example, for water droplets in steam, or they can also be two different materials, such as, for example, solid particles (e.g. sand) entrained in a liquid or gas. An embodiment of the invention relates to a combination, in which the first phase is a gas and the second phase is a liquid, which is at least partially carried as droplets distributed in the flowing gas. The invention especially relates to a combination, in which the second phase is water (which is carried at least partially distributed as water droplets) and the first phase is steam. The particle and/or droplet flow can be formed, in such case, from more than one medium, especially from particles of at least two different materials. Each of the further developments explained below, even if not explicitly noted each time (by the statement of "at least a second medium, or phase"), pertains to this variant. In such case, "distributed particle and/or droplet flow" generally refers to a flow, in which the at least a second medium or phase is (at least partially) distributed as particles and/or droplets in the first phase and is carried by the first phase.

The vortex flow measuring device can be constructed, apart from the explicitly special features mentioned herein, basically in different manners as especially known from the state of the art. Especially, the basic construction of a vortex flow measuring device can correspond to a vortex flow measuring device as explained in the introduction. Regarding the arrangement and construction of the vortex sensor, different variants are possible, such as, for example, an integral part of the bluff body or a separate part as a paddle, which is arranged downstream from the bluff body. The terminology "acoustic transducer" refers to a transducer or sensor, which registers incoming acoustic signals and transduces the signals to electrical signals corresponding to the respective acoustic signals. As a variant, for example, the acoustic transducer can be embodied integrated into the component directly at the site of the component, where the particles and/or droplets of the second phase impact, and the acoustic transducer can directly register the produced acoustic signals. Additionally, the acoustic transducer can alternatively be embodied at a site remote from the site of the impingement, either integrated in the component or separated from the component. In the latter case, it must be acoustically coupled to the component in such a manner that the respective acoustic signals (sound waves) at the site of the component, which the particles or droplets impact, can propagate to the acoustic transducer. Especially, the acoustic transducer can also be arranged outside the measuring tube.

In an advantageous further development, the component of the vortex flow measuring device, especially the bluff body, includes an impingement area oriented essentially perpendicular to the direction of the flow. The impingement area faces the flow in an installed position of the vortex flow measuring device. In this way, the particle and/or droplet flow flows directly into the impingement area and the ratio of the size of the impingement area to the total area of the inner cross section of the measuring tube can be simply determined. Additionally, the particles and/or droplets impact the impingement area essentially at a unique angle. These properties are not only advantageous for a reliable detection of a second phase in the form a particle and/or droplet flow. They also facilitate calculations to quantitatively estimate the particle and/or droplet flow over the total inner cross section of the measuring tube.

Preferably, the component, in the case of which the impingement of the particle and/or droplet flow is acoustically registered, is formed by the bluff body of the vortex flow measuring device. Alternatively, however, another component can be applied for this purpose, embodied, for example, as a paddle of the vortex sensor separate from the bluff body. The bluff body has the advantage, that as a rule, the bluff body is triangular (or Δ-shaped) in cross section and an area of the bluff body is oriented perpendicular to the flow direction and faces the flow. This facing area forms, in such case, an impingement area with defined dimensions for the incoming particles and/or droplets. Accordingly, its ratio to the inner cross section of the measuring tube can be simply determined for a quantitative determination of the particle and/or droplet flow. The two additional surfaces meet one another in the direction of flow, so that the width of the bluff body tapers in the flow direction. The two shedding edges, which form the transitions to the respective lateral surfaces on both sides of the impingement area, can also be rounded. Besides the bluff body shape with a triangular cross section already mentioned, alternative forms of bluff bodies also exist, which are likewise suited very well for application as a component to acoustically register the impingement of the particle and/or droplet flow. A further advantage in the application of the bluff body is that the arriving flow is influenced, in the region before the bluff body, by the alternating vortex shedding at the bluff body. This leads to the impingement area of the bluff body not being impacted exactly perpendicularly. Instead, it is impacted at a slight inclination on alternating sides (corresponding to the frequency of the vortex shedding). In this way, deposition of particles and/or droplets on the impingement area of the bluff body is effectively prevented.

Fundamentally, the transducing of the acoustic signals to electrical signals by the acoustic transducer can occur in different manners. In an advantageous further development, the acoustic transducer is formed as a piezoelectric or capacitive transducer.

In an advantageous further development, the acoustic transducer is arranged outside the measuring tube and is acoustically coupled to a component of the vortex flow measuring device, especially the bluff body. In this way, the acoustic transducer is largely decoupled from the process temperature and the process pressure, so that its operation is not influenced or is only influenced a little by these variables.

In an advantageous further development, an electronics of the vortex flow measuring device is embodied in such a manner that the electric signals provided by the acoustic transducer are evaluated by the electronics based on predetermined criteria. It can especially be fixed with the predetermined criteria when a particle and/or droplet flow is detected by the characteristic properties of the electrical signals (for example, in the case of exceeding a predetermined signal level). The electronics can be integrated, in such case, in an electronics (already present) of the vortex flow measuring device already provided for evaluating a measurement signal of the vortex sensor. "Electronics" refers herein both to an analog electronic circuit, through which signals, especially electrical signals, are processed, as well as a digital circuit or processor, through which electrical signals are processed digitally. These two forms can especially also be used in combination.

In an advantageous further development, an electronics of the vortex flow measuring device is embodied in such a manner that electric signals provided by the acoustic transducer are filtered by the electronics to a bandwidth to be evaluated. In this way, errors due to disturbance signals with frequencies outside the relevant frequency range can be prevented. Along with that, other signal processing, such as, for example, an amplification of the electric signals before or after the filtering can be performed.

In an advantageous further development, an electronics of the vortex flow measuring device is embodied in such a manner that the electronics determines a measured variable by a spectral signal processing and/or a statistical evaluation from the electrical signals provided by the acoustic transducer. The measured variable is then evaluated using predetermined criteria. For example, for such a measured variable, limit values can be fixed that in the case of being exceeded or subceeded, a warning report and/or a corresponding report (via a display, for example) relative to the presence of a particle and/or droplet flow is output to the user. Additionally, based on such a measured variable, as explained below in reference to further developments, other calculations can be performed, in order to be able to develop quantitative information relative to the second phase in the form of a particle and/or droplet flow.

In an advantageous further development, an electronics of the vortex flow measuring device is embodied in such a manner that the electronics generates an RMS value (RMS: Root Mean Square; quadratic mean value) from values of the electrical signals registered over time, filtered in given cases, provided by the acoustic transducer and evaluates these as measured variables. It has been found experimentally that the RMS value is well suited as a measured variable for a further evaluation. If, for example, N values of the (here filtered)

electrical signal $S(t_i)$, which were registered at N different times $t_i$ (i=1 to N), are taken into consideration for calculating the RMS value $\overline{S}$, then the RMS value can be obtained using the following equation:

$$\overline{S} = \frac{1}{N}\sqrt{\sum_{i=1}^{i=N} S(t_i)^2} \quad (1)$$

In an advantageous further development, the electronics of the vortex flow measuring device is embodied in such a manner that the electronics determines a number and mass of individual particles and/or droplets or the mass flow of the particle and/or droplet flow from the measured variable by means of a transmission factor determined by a calibration, through the correlation of the transfer factor to the kinetic energy of individual particles and/or droplets, or the kinetic power of the particle and/or droplet flow with the measured variable, and the velocity of the particle and/or droplet flow. In this way, a quantitative determination of the second phase in the form of a particle and/or droplet flow is possible.

Depending on application, the transfer factor, according to a first variant, can be selected and determined by calibration in such a manner that the measured variable $\overline{M}$, such as for example, the RMS value $\overline{S}$ mentioned above, is correlated with the kinetic energy $E_{KIN}$ of an individual, incoming particle or droplet using the transfer factor $C_1$. This relationship is given in the following Equation (2), wherein $m_p$ is the mass of an individual particle or droplet and v is its velocity:

$$E_{KIN} = \frac{1}{2}m_p v^2 = C_1 \overline{M} \quad (2)$$

As is evident in Equation (2), the mass $m_p$ of an individual particle or droplet can accordingly be determined from the measured variable, $\overline{M}$, the transfer factor $C_1$ and the velocity v. The velocity of the particle, as explained below in reference to a further development, can also be determined by the vortex flow measuring device from the vortex frequency. This first variant is especially advantageous when the density of the individual particles and/or droplets in the particle and/or droplet flow is sufficiently low that the different points in time of impact of the individual particles and/or droplets on the concerned component of the vortex flow measuring device are separately acoustically detectable. The number of particles and/or droplets can be ascertained by counting the respective impacts.

Depending on application, the transfer factor, according to a second variant, can be selected and be determined by calibration in such a manner that the measured variable $\overline{M}$, such as for example, the RMS value $\overline{S}$ mentioned above, is correlated to the kinetic power $P_{KIN}$ of the particle and/or droplet flow using the transfer factor $C_2$. This relationship is given in the following Equation (3), wherein m/t is the mass flow of the particle and/or droplet flow (wherein this concerns only the mass of the particles and/or droplets, and not the mass of the first phase) and v is its velocity:

$$P_{KIN} = \frac{1}{2}\frac{m}{t}v^2 = C_2 \overline{M} \quad (3)$$

As is evident in Equation (3), the mass flow m/t of the particle and/or droplet flow can accordingly be determined from the measured variable $\overline{M}$, the transfer factor $C_2$ and the velocity v. The velocity v of the particles, as explained below in connection with a further development, can also be determined by the vortex flow measuring device from the vortex frequency. This second variant is then especially advantageous when the density of the individual particles and/or droplets in the particle and/or droplet flow is so high that the different impacts of the individual particles and/or droplets on the concerned component of the vortex flow measuring device are no longer separately acoustically detectable.

Both in the case of the first variant as well as also in the case of the second variant, the transfer factor $C_1$, or $C_2$ can be selected as a constant, so that the calibration and the calculations to be carried out are simple. Alternatively, the transfer factor $C_1$, or $C_2$, can also be defined as a function of additional variables, such as for example, temperature or pressure. In this way, other influences affecting the quantitative determination can be taken into consideration.

In an advantageous further development, the vortex sensor is embodied in such a manner that pressure fluctuations are registered and transduced into an electrical measurement signal by the vortex sensor during use, wherein an electronics of the vortex flow measuring device is embodied in such a manner that the electronics determines a vortex frequency from the registered pressure fluctuations and in turn determines a flow velocity of the first phase (as well as, therewith, the particle and/or droplet flow) from the vortex frequency. As mentioned above, the vortex frequency is proportional over a broad range of Reynolds numbers to the velocity of the respectively measured fluid. This dependence is generally known and is utilized in known manner for determining the velocity of a measured fluid in vortex flow measuring devices. Through this dependence, the velocity v of the particle and/or droplet flow is determined simultaneously with the determination of the flow velocity of the first phase provided by the present further development from the vortex frequency (under the assumption that the particle and/or droplet flow flows with the same velocity as the first fluid). Accordingly, the velocity v of the particle and/or droplet flow determined by the vortex flow measuring device can be applied in equation(s) (2) and/or (3) and therefrom then the mass $m_p$ of individual particles or droplets, or the mass flow m/t of the particle and/or droplet flow, can be determined.

In an advantageous further development, the vortex flow measuring device comprises at least one diaphragm, especially a sieve shaped, perforated or lattice shaped diaphragm, which is arranged, relative to the flow direction, before the component of the vortex flow measuring device in which the acoustic transducer is integrally formed or to which the acoustic transducer is acoustically coupled, for homogenizing the particle and/or droplet flow of the second phase. A uniform particle and/or droplet flow distributed over the inner cross section of the measuring tube can be achieved through such a diaphragm. The total number and mass of individual particles and/or droplets, or the total mass flow of the particle and/or droplet flow within the measuring tube can be deduced in simple manner, (linearly) from the number and mass of individual particles and/or droplets (see first variant), or from the mass flow of the particle and/or droplet flow (see second variant), which was/were determined based on the impact on the component. In such case, one or a number of diaphragms can be arranged before the component of the vortex flow measuring device. Especially, the arrangement can be optimized in such a manner that a particle and/or droplet flow distributed as homogeneously as possible is achieved over the inner cross section of the measuring tube.

Additionally, the at least one diaphragm can also be arranged in such a manner that it extends up to a tube wall of the measuring tube. Therewith a second or third phase, in the form of a wall flow, which flows along the tube wall of the measuring tube, can also be compelled to flow as a particle and/or droplet flow in the region of the vortex flow measuring device and especially in the region of the component that performs the acoustic registering. In this way the fraction of the second or third phase, which flows as a wall flow along the tube wall of the measuring tube, can also be detected, and in given cases, be quantitatively registered by the vortex flow measuring device of the invention. The provision of a diaphragm to transform a wall flow into a particle and/or droplet flow, however, is not possible in all applications.

It is desirable to also directly monitor a second or a third phase in the form of a wall flow and to register a second or a third phase in the form of a wall flow quantitatively in given cases. In an advantageous further development it is accordingly provided that the vortex sensor of the vortex flow measuring device has a sensitive section, which responds to pressure fluctuations, and which is arranged at least partially adjoining the tube wall of the measuring tube, in order to detect, in this way, a second or third phase in the form of a wall flow, especially a rivulet, flowing along a tube wall, of the multiphase medium flowing in the pipeline. In such case, the first phase, especially a gaseous, first phase, of the flowing medium has a lower density than the second or third phase. In such case, the vortex flow measuring device is embodied in such a manner that pressure fluctuations, which are registered by the sensitive section, are transduced to an electrical measurement signal. Additionally, an electronics, by which the electrical measurement signal is processed in the vortex flow measuring device during use, is embodied in such a manner that in the case of registering a measurement signal, which is characteristic for an interaction of a wall flow of the second or third phase flowing along a tube wall of the measuring tube with the sensitive section of the vortex sensor, the existence of a wall flow of the second or third phase in the measuring tube is deduced.

On the basis of these considerations, this further development enables, with a vortex flow measuring device, with which the flow velocity of the first phase, especially a gas, can be determined from the vortex frequency of the vortices registered during use, also simultaneously the detection in near time (i.e. online) of the occurrence a wall flow of the second and/or third phase, especially of a rivulet, along the tube wall of the measuring tube. No supplemental device for detecting a wall flow is required in such case. Accordingly, the number of components and, therewith, costs can be kept small. The monitoring is achieved, in such case, especially by the arrangement of the sensitive section at least partially adjoining the tube wall of the measuring tube so that a wall flow flowing past the sensitive section can interact with the sensitive section. In addition to the vortices of the first phase, the interactions related to a wall flow of the second or third phase can also accordingly be registered by the sensitive section, this leading to a measurement signal, which is characteristic for this interaction of the wall flow with the sensitive section of the vortex sensor. On the basis of this measurement signal, it can then be determined in simple manner whether a second or third phase is present in the form of a wall flow. This can occur, preferably, automatically, in the vortex flow measuring device (especially an electronics of the vortex flow measuring device) and can be displayed to a user or signaled in some other way.

In this further development, at least one phase in the form of a wall flow can be detected in addition to another phase in the form of a particle and/or droplet flow, which can arise at times in given cases. Preferably, the respective phases (the wall flow as well as the particle and/or droplet flow) are each a medium in the liquid aggregate state. The further development is especially applicable in mixtures of the first phase and at least a second and/or third phase, in which the density difference between the first phase and the second and/or third phase is so great that they do not or only slightly mix and accordingly the second or third phase, in flowing through a pipeline, flows at least partially as a wall flow. Under these assumptions, the second and/or third phase then flows, as a rule, along a lower tube wall section of the pipeline (or measuring tube) in an inclined or horizontal pipeline (or measuring tube).

An "adjoining arrangement" of the sensitive section on the tube wall refers to arrangements in which the sensitive section is directly on the tube wall of the measuring tube as well as arrangements in which the sensitive section is spaced so near to the tube wall of the measuring tube that with typically arising wall flows, the thickness of the wall flow is greater than the distance of the sensitive section from the tube wall and therewith an interaction of the wall flow with the sensitive section can occur. Additionally, the sensitive section preferably extends further into the inner space of the measuring tube, so that an interaction with the flow the first phase also occurs. Especially, it is provided in such case, that the sensitive section extends parallel to the bluff body and is arranged aligned with the bluff body relative to the flow direction.

As a measurement signal, which is characteristic for an interaction of a wall flow of the second and/or third phase of a two or more phase medium, which flows along a tube wall of the measuring tube, with the sensitive section of the vortex sensor, a measurement signal is especially understood, which has characteristic deviations compared to a measurement signal of a pure flow of the first phase; wherein these characteristic deviations are brought about through the wall flow of the second (or third) phase of the flowing two or more phase medium interacting with the sensitive section of the vortex sensor. The interaction is preferably direct in such case, due to the arrangement of the sensitive section, which means that the wall flow flows directly past the sensitive section (in given cases, in contact with the same) and therewith causes pressure fluctuations, which are registered by the sensitive section.

In an advantageous further development, the measuring tube is arranged angled away from a vertical direction, especially horizontally, and the sensitive section of the vortex sensor is arranged in the lower half of the measuring tube, especially at the lowest surface element of the measuring tube. Through such a horizontal or inclined arrangement of the measuring tube, the wall flow of the second or third phase collects primarily in the lower half of the measuring tube due to the force of gravity. Accordingly, it can be assured that the wall flow of the second or third phase is detected by the vortex flow measuring device through the targeted arrangement of the sensitive section in the lower half of the measuring tube, especially at the lowest surface element of the measuring tube. Preferably, in such case, the measuring tube is arranged horizontally, which means perpendicular to the direction of the force of gravity, or essentially horizontally, so that the force of gravity does not or does not noticeably affect the flow velocity of the second phase.

In an advantageous further development, the sensitive section of the vortex sensor is formed by a swinging section, which is displaceable in a swinging movement by the pressure fluctuations brought about by the vortices shed by the bluff body. In such case, the electrical measurement signal is produced by registering the swinging movements of the swinging section and transducing such into the electrical measurement signal. The transducing preferably occurs, in such case, in such a manner that the amplitude of the electrical measurement signal corresponds as a function of time to the swinging executed movements. The conversion of the swinging movements into an electrical measurement signal can occur, in such case, in different ways, especially by capacitive, piezoresistive, optical, ultrasound, thermistor, or mechanical registering of the respective position of the swinging section as well by registering the respective position of the swinging section by a pressure, or strain, gage.

The registering of the respective (time dependent) positions of the swinging section can especially occur by a DSC sensor (DSC: Digital Switched Capacitor). In this type of sensor, the swinging movements of the swinging section are converted to differential electrical charge changes by means of two electrically switched capacitances and evaluated by a suitable measuring electronics.

In the case of a type of such a DSC sensor, for example, the swinging movements of the swinging section are transmitted to a sleeve-like middle electrode. The sleeve-like middle electrode can especially be embodied directly on an extension of the swinging section. Additionally, an outer electrode, decoupled from the pressure fluctuations, is provided; the outer electrode is formed from two half shells, which are concentrically arranged around the sleeve-like middle electrode. Accordingly, the sleeve-like middle electrode forms two capacitances $C_1$ and $C_2$, one with each of the two half shells. As a rule, the outer electrode, which is, in such case, decoupled from the pressure fluctuations, is arranged in a fixed location isolated from the movements caused by the outer disturbing influences. Corresponding to the swinging movements of the swinging section, the capacitances $C_1$ and $C_2$ change, wherein these capacitance changes are evaluated by a suitable measuring electronics.

As explained above, the swingable section of the vortex sensor, which can especially be embodied as a swingable shell, can be integrated in the bluff body. It can especially be situated in a blind bore of the bluff body. In such case the blind bore is in communication with the flow within the measuring tube via one or a number of passageways, so that the swingable section can sense the pressure fluctuations via these passageways. Additionally, the vortex sensor comprises, as a rule, a section decoupled from the pressure fluctuations; the decoupled section is arranged, for example, within the swinging section, especially within the swinging shell. As a rule in such case, the section decoupled from the pressure fluctuations is arranged at a fixed location separate from movements caused by outer disturbing influences. In this way, the distance changes between the swinging and the decoupled section can be registered and transduced into an electrical measurement signal using one of the ways explained above. In such case, the passageways are arranged in the present invention at least partially bordering on the tube wall of the measuring tube, so that an interaction of a wall flow of the second or third phase flowing along the tube wall of the measuring tube with the swinging section of the vortex sensor is enabled. If the measuring tube is arranged inclined or horizontally, then the passageways are preferably arranged at least partially in the lower half of the measuring tube.

Additionally, the swinging section of the vortex sensor can be formed by a swinging paddle, which is separately embodied and arranged downstream from the bluff body or is also partially or completely introduced into the bluff body through a cavity; the swinging paddle extends from a tube wall of the measuring tube into the flow path. Preferably, the paddle extends in such case, essentially radially (to the measuring tube) and parallel to the bluff body and is arranged along the extension direction of the measuring tube in alignment with the bluff body. Again, the vortex sensor in this embodiment, as a rule, also comprises a section decoupled from the pressure fluctuations. As a rule, in such case, the section decoupled from the pressure fluctuations is arranged at a fixed location separate from movements caused by outer disturbing influences. Accordingly, the distance changes between the swinging section and the decoupled section can be registered in one of the ways explained above and be transduced into an electrical measurement signal.

The time dependent (electrical) measurement signal y(t) can be described approximately as a frequency/amplitude modulation signal with a superimposed noise fraction. It comprises the actual vortex signal, which can be described as a sinusoidal oscillation with a time dependent amplitude A(t) and a likewise time dependent phase Θ(t) plus additive noise fractions R(t) of different origins and characteristics. Thus noise from the differential pressure fluctuations in the flow is caused by flow noise. The noise fractions can also occur through superimposed oscillations due to vibrations or resonance signals given by the sensor or construction of the measuring device, which are mechanically coupled to the sensor. The vortex signal can consequently be described approximately by the following formulas (4):

$$y(t) = A(t) \cdot \sin(\Theta(t)) + R(t) \quad (4)$$

$$A(t) = A_0 + \Delta a$$

$$\Theta(t) = \omega_{mv}(t) \cdot t + \int_0^t m(t) dt$$

$$2 \cdot \pi \cdot f_{mv}(t) = \omega_{mv}(t) = \dot{\Theta}(t)$$

Figure 2:
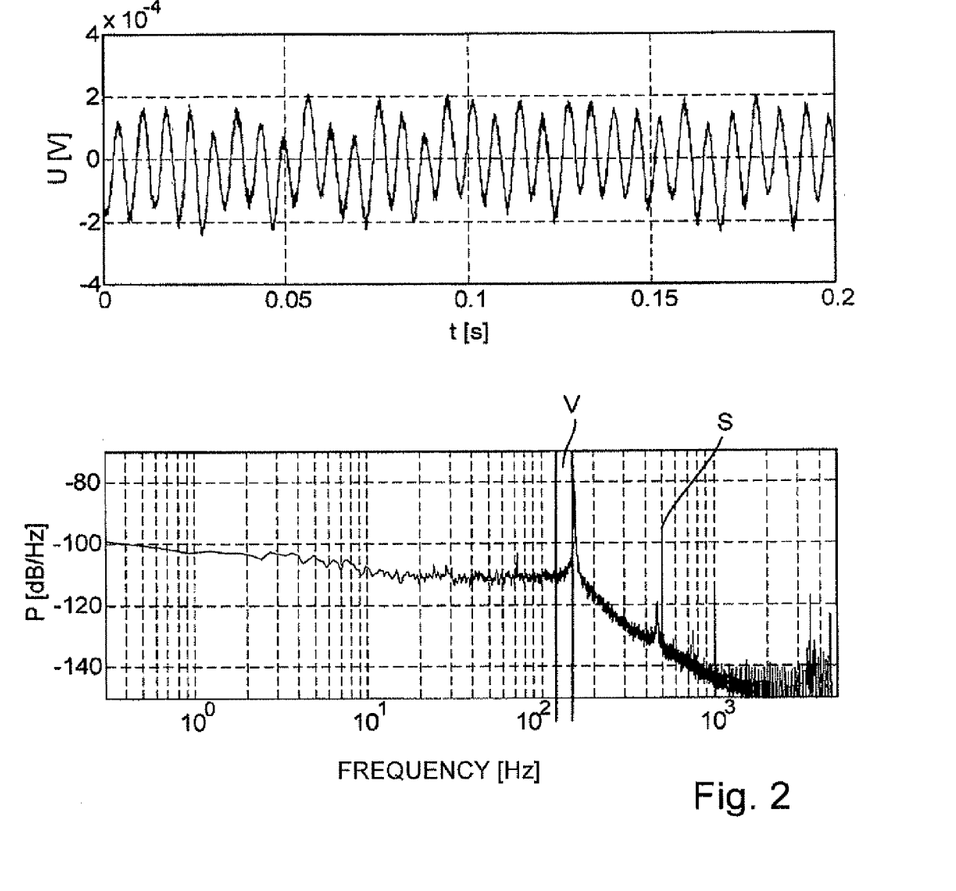
FIG. 2 is a typical measurement signal of a pure, single phase flow (air) with superimposed disturbance fractions due to vibrations.

The time dependent amplitude A(t) is composed of an average amplitude $A_0$ and an additive amplitude variation $\Delta a$, which possesses an assumed Gaussian distribution with an average value of 0 and a variance $\sigma_A^2$. The relationship of the variable phase Θ(t) and the instantaneous vortex frequency $f_{mv}(t)$ is given by the first derivation of the variable phase Θ(t) composed of the instantaneous vortex angular frequency $\omega_{mv}(t)$ and the additive phase noise, which is defined as the integral of a frequency modulation m(t) with respect to time. The frequency modulation is assumed to be Gaussian noise with an average value of 0 and a variance $\sigma_R^2$. A typical measurement signal and its spectrum are shown in FIG. 2.

In order to monitor a second phase in the form of a rivulet or wall flow in the flowing medium and also to estimate the volume or mass fraction of this second phase, the measurement signal y(t) is preferably filtered first to a small relative bandwidth with the vortex frequency as the center frequency. This is explained below in reference to a further development. The filtered real signal s(t) or even especially the amplitude $A_s(t)$ of the filtered real signal s(t) contains the necessary information to develop information on the presence of a second phase and its mass fraction. The fluctuations of the amplitude of the preferably narrow band filtered signal can now be statistically (preferably via the standard deviation of the amplitude $A_s(t)$ or even via the kurtosis of the narrow band filtered signal s(t)) registered and expressed and provide a direct measure, which can be taken into consideration for detecting presence of, and measuring, the mass or volume fraction of a second phase.

An option for an embodiment of the variant of the selective filtering and signal processing described above is mentioned here. The amplitude $A_s(t)$ can especially be obtained via the analytical signal of the filtered measurement signal s(t). For this, the filtered measurement signal is converted into the filtered analytical signal $s_a(t)$ using a Hilbert transform:

$$s_a(t)=I(t)+j\cdot Q(t)=|A_s(t)|\cdot e^{j\Phi(t)} \quad (5)$$

where $s_a(t)$ is composed of the real part I(t) (in phase signal), which corresponds to the filtered real signal s(t), and the complex part Q(t) (quadrature signal); j is the complex operator sqrt(−1).

The instantaneous magnitude of the amplitude $|A_s(t)|$ for the point in time $t=t_i$ can then be calculated using equation (6):

$$|A_s(t)|=\sqrt{I(t)^2+Q(t)^2} \quad (6)$$

Furthermore, the instantaneous vortex frequency can be calculated from the analytical signal by differentiating phase Φ(t) with respect to time:

$$\Phi(t) = \arctan\left(\frac{Q(t)}{I(t)}\right) \quad (7)$$

$$f_v = \frac{1}{2\pi} \cdot \frac{d\Phi(t)}{dt}$$

An increased fluctuation of the amplitude of the narrow band filtered analytical signal $s_a(t)$ versus time is measurable due to the interaction of a wall flow of the second or third phase flowing along a tube wall of the measuring tube with the sensitive section of the first vortex sensor. The interaction thus leads to an increased amplitude modulation of the registered measurement signal, preferably the narrow band filtered measurement signal. In such case, these fluctuations can be statistically evaluated in different ways and used as a measure of whether and, if so, to what extent a mass/volume flow of a wall flow in the form of the second or third phase is occurring. Accordingly, a wall flow of the second phase can be detected and measured in a simple manner by determining the fluctuations of the magnitude of the amplitude $|A_s(t)|$ of the narrow band filtered analytical signal $s_a(t)$ versus time. Preferably in such case, fluctuations in the magnitude of the amplitude $|A_s(t)|$ within the vortex flow measuring device are evaluated and monitored automatically, especially through correspondingly embodied electronics. The term "electronics" as used herein refers both to an electronic circuit, by which signals, especially electrical signals, are processed in analog fashion as well as to a digital circuit or a processor, by which electrical signals are processed digitally. Especially, both of these forms can also be used together.

It is understood that other developments for amplitude measurement and statistical evaluation of the fluctuations can be used. Thus, for example, a rectifier and a low-pass filter connected downstream can also detect an average amplitude and its fluctuation. It is also understood that the evaluation of the amplitude fluctuations can occur in other ways.

As already mentioned in one of the previous sections, besides other statistical evaluation options, especially the standard deviation of the magnitude of the amplitude $|A_s(t)|$ can be taken into consideration. It has been found that the greater the estimated standard deviation of the magnitude of the amplitude, the greater the proportion of the second phase arising in the form of a wall flow.

Additionally, the kurtosis of the preferably narrow band filtered, real part of the analytical signal $s_a(t)$, abbreviated as $Re\{s_a(t)\}$, which corresponds to s(t), can also be taken into consideration as a measure for the mass/volume fraction of the second phase. The greater the kurtosis of $Re\{s_a(t)\}$, the greater are the deviations from a pure sinusoidal oscillation, which has a kurtosis value of 1.5.

Both in determining the standard deviation of the magnitude of the amplitude of the analytical signal as well as also in determining the kurtosis of the preferably narrow band filtered measurement signal s(t), it is enabled that limit values for the standard deviation or the kurtosis be fixed in advance (for a certain combination of a first and second phase of a two or more phase, flowing medium). Limit values can be established, whose exceeding means a second phase is present and can accordingly be detected. Additionally, a further limit value can supplementally or alternatively be fixed; a certain mass flow of the second phase is exceeded when this further limit value is exceeded and accordingly a warning report is output.

The standard deviation $\sigma_A$ of the magnitude of amplitude $A_s(t)$ can be calculated using the following equation (8).

$$\sigma_A = \sqrt{\frac{1}{N}\sum_{t_i=t_i}^{t_i=t_N}(|A_s(t_i)|-\overline{A_s})^2} \quad (8)$$

In total, N values are incorporated in the calculation.

$\overline{A_s}$ is the arithmetic average of the magnitude of the amplitude measured over N values:

The kurtosis β (or the normalized fourth moment) of the preferably narrow band filtered, measurement signal s(t) can be calculated using the following equation (9) using the fourth moment $\mu_4$ and the standard deviation $\sigma_s$. In such case, the standard deviation $\sigma_s$ can be obtained using equation (10), and the fourth central moment $\mu_4$ using equation (11).

$$\beta = \frac{\mu_4}{\sigma_s^4} \quad (9)$$

$$\sigma_s = \sqrt{\frac{1}{N}\sum_{t_i=t_i}^{t_i=t_N}(s(t_i)-\overline{s})^2} \quad (10)$$

$$\mu_4 = \frac{1}{N}\sum_{t_i=t_i}^{t_i=t_N}(s(t_i)-\overline{s})^4 \quad (11)$$

$t_i$ stands for a discrete point in time of the measurement.

On the whole, N values are incorporated in the calculation.

$s(t_i)$ is the value of the narrow band filtered measurement signal at measurement time point $t_i$, $\overline{s}$ is the arithmetic average of the N values of the narrow band filtered measurement signal.

The kurtosis β, or the fourth moment is, in such case, a measure of the peakedness of a statistical distribution (around its average value). Besides the fourth moment, there is also what is known as the first moment, which corresponds to the expected value of random variables, thus the average value; the second moment, which corresponds to the variance, and the third moment, which is also referred to as skewness, after normalization. Skewness and peakedness are often used as measures of deviation from the normal distribution.

While each of the equations (9), (10) and (11) hold for N discrete values, a corresponding representation in the form of an integral of the respective signals that are continuously registered is also possible. Determining standard deviation and/or kurtosis can occur through corresponding electronics embodied within the vortex flow measuring device in such a manner that each of the ascertained magnitudes of the amplitudes $|A_s(t)|$, or the measured values s(t) at discrete time points $t=t_i$, with i being consecutive whole numbers, are stored in a buffer or ring memory. The storing can occur, in such case, in such a manner that a predetermined number of values is storable in the buffer memory, and that in the case of adding a new value $|A_s(t_i)|$, or $s(t_i)$, the oldest value is deleted from the buffer memory so that the individual values are "pushed" through the different positions of the buffer memory. The N values, which are used for calculating the standard deviation or the kurtosis, can be selected, in such case, by a corresponding selection window of N values, for example 100 values. Calculating the standard deviation or the kurtosis can then occur, for example, within predetermined time intervals each time, when, within the selection window, one (or more) value(s) have come in (and a corresponding number of old values have left) or also first, when all values are replaced by new values within the selection window.

In an advantageous further development already described in one of the sections above, for judging whether the measurement signal contains features characteristic for an interaction of a second phase, in the form a wall flow along a tube wall of the measuring tube, with the sensitive section of the first vortex sensor, the measurement signal is selectively filtered to a narrow band with a small relative bandwidth with the vortex frequency as the center frequency. Through such a selective filtering, only the frequency ranges in the region around the vortex frequency are taken into consideration and disturbance fractions with frequencies, which differ from the vortex frequency, are filtered out. Especially, this frequency range has a width of preferably less than 50% of the vortex frequency, with the vortex frequency as the center frequency.

In an advantageous further development, the electronics of the vortex flow measuring device is embodied in such a manner that a statistical variable, which represents a measure for the amplitude fluctuations contained in the narrow band filtered signal s(t), is determinable by the electronics from the measurement signal registered by the vortex sensor. Additionally, a mass flow of the predetermined, second phase is determinable by the electronics from a vortex frequency determined from the measurement signal by the vortex flow measuring device, and from a standard deviation or kurtosis determined from the measurement signal by the vortex flow measuring device, by making use of a correlation found in advance as part of a calibration (for each of first and second phases of a medium). In determining the correlation, in advance, as part of a calibration, 1) known mass flows of a wall flow of a predetermined second phase, 2) vortex frequencies, which were determined for different flow velocities of the first phase by the vortex flow measuring device from the measurement signal, and 3) the associated standard deviations or kurtosis determined by the vortex flow measuring device from the measurement signal are set in relationship to one another. This means that different (known) mass flows of the second phase and different flow velocities of the first phase are set as part of the calibration and for these different values in each case, the associated vortex frequency and standard deviation or kurtosis are determined by the vortex flow measuring device. Based on this correlation, the mass flow of the wall flow of the second phase can then be determined quantitatively by the vortex flow measuring device in a simple manner based on the standard deviation or kurtosis determined from the measurement signal as well as from the vortex frequency, by reference to the correlation. Such a quantitative determination of the mass flow of the wall flow of the second phase is especially advantageous in the case of a horizontal arrangement of the measuring tube, or a slightly inclined arrangement, if a horizontal arrangement is not possible. In an advantageous further development, the correlation, especially in the form of a fitted function, is stored in the vortex flow measuring device.

In an advantageous further development, the vortex sensor comprises a swinging paddle, which extends into the flow path through an opening formed downstream from the bluff body in a lower section, especially at the lowest surface element, of the (inclined or horizontally arranged) measuring tube. Accordingly, the vortex sensor comprises a sensitive section (paddle), which adjoins the tube and is (at least partially) arranged in the lower tube half. The use of a paddle as a sensitive section is advantageous, since an interaction with the sensor paddle takes place with the occurrence of a wall flow of a second or third phase, and thereby causes an increased amplitude fluctuation of the registered measurement signal versus time.

Preferably, a recess for accommodating the second or third phase, which is flowing past as a wall flow, is formed around the paddle. Through the provision of a recess and the thereby related accumulating of the second or third phase, in case it is flowing past as a wall flow in the region of the paddle, interaction between the second or the third phase and the paddle is increased. In such case, the recess is preferably embodied in such a manner that, when the wall flow is interrupted, the second or third phase then remaining in the recess is taken (or purged) by the first phase flowing past and the recess is emptied. In this way, it is assured that at the times in which no wall flow occurs, the measurement signal is not corrupted by remnants of the second or third phase remaining in the recess.

Additionally, the invention relates to a method for monitoring and/or measuring by a vortex flow measuring device an, at least at times, two or more phase medium flowing in a pipeline, wherein the medium has a first phase, especially a gaseous, first phase, with a first density and a second phase, especially a particle, or droplet, shaped, second phase, having a second density different from the first density. The vortex flow measuring device comprises at least one measuring tube inserted into the pipeline, a bluff body, and a vortex sensor, which responds to pressure fluctuations, wherein the bluff body extends into the measuring tube transversely to a flow direction in such a manner that a flow path is formed on both sides of the bluff body for each particular phase. At least two shedding edges are embodied on both sides of the bluff body in such a manner that Kármán vortices are shed by these shedding edges. The vortex sensor is arranged downstream from the shedding edges. The method comprises, in such case, steps as follows:

A) Registering by an acoustic transducer of acoustic signals, which are produced by impact of particles and/or droplets of the second phase on a component of the vortex flow measuring device, especially the bluff body, which protrudes into a flow path within the measuring tube; and B) transducing by the acoustic transducer of the acoustic signals registered by the acoustic transducer into electrical signals.

The further developments and variants, in reference to the vortex flow measuring device of the invention explained above, are implementable in a corresponding manner with the method of the invention. These further developments are not explicitly explored here again. Especially the steps, which are executed by the electronics in the vortex flow measuring device explained above, can be implemented as corresponding method steps with the present method.

BRIEF DESCRIPTION OF THE DRAWINGS

Other advantages and utilities of the invention will become evident based on the following description of an example of an embodiment with reference to the appended drawing, the figures of which show as follows.

DETAILED DISCUSSION IN CONJUNCTION WITH THE DRAWINGS

Figure 1:
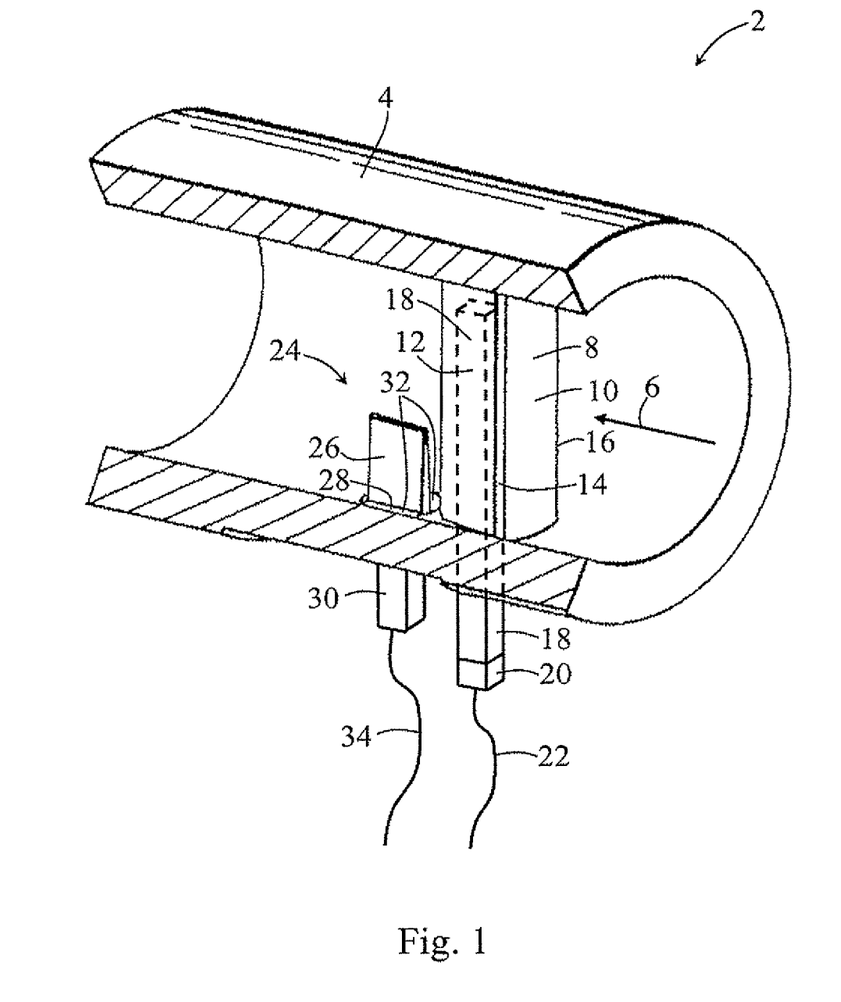
FIG. 1: is a schematic, perspective, partially sectioned representation of a vortex flow measuring device according to a form of embodiment of the invention.

FIG. 1 shows, schematically and perspectively, a vortex flow measuring device 2 according to a form of embodiment of the invention. Vortex flow measuring device 2 includes a measuring tube 4, which is shown in a partially sectioned representation in FIG. 1. In use, the measuring tube 4 is inserted into a pipeline (not shown), in which the flow of a first fluid (here: gas) is to be determined, in such a manner that the first fluid (corresponding to the "first phase") flows through the measuring tube in a flow direction 6.

The vortex flow measuring device 2 includes a bluff body 8, which extends across the total inner cross section of the measuring tube 4 in a diametral direction. In such case, the bluff body 8 is embodied in such a manner that it has an impingement area 10 on the side facing the flow; the impingement area is flowed onto by the first fluid and by the particle and/or droplet flow, to the extent that such occurs. Both sides of the impingement area are bordered by lateral surfaces 12, wherein the two lateral surfaces 12 taper in the flow direction 6, so that the bluff body 8 has an essentially Δ-shaped cross section. Shedding edges (rounded) 14, 16 are provided on each of the two sides of the impingement area; the shedding edges form the transition to the two lateral surfaces 12. As is evident based on FIG. 1, each phase of the multiphase medium (the first phase as well as particles and/or droplets carried, in given cases, in the first phase) can flow past the two sides of the bluff body 8, wherein, as explained above, vortices are shed on alternating sides by the two shedding edges 14, 16. As explained above, the flow of each phase is already influenced in the region upstream of the bluff body 8 by the alternating shedding of vortices. This leads to the impingement area 10 of the bluff body 8 being flowed into by the respective medium on alternating sides and slightly inclined. A Kármán vortex street forms in the region downstream from the two shedding edges 14, 16

If there is a particle and/or droplet flow (here: a droplet flow of water) in the flowing first phase (here: gas), then a fraction of the particles and/or droplets, which, as a rule, corresponds to the ratio of the impingement area 10 to the inner cross sectional area of the measuring tube 4 (in the case of a uniformly distributed particle and/or droplet flow over the inner cross section), impacts on the impingement area 10 of the bluff body 8. Acoustic signals are produced through such an impact of particles and/or droplets. A coupling component 18, arranged within the bluff body 8, is represented as a rod in FIG. 1 and serves for the acoustic coupling between an acoustic transducer 20 and the bluff body 8 (especially its impingement area 10). The acoustic signals produced by the impact of particles and/or droplets on the impingement area 10 are led out from the measuring tube 4 to the outside by this coupling component 18. The acoustic transducer 20, which in of the present form of embodiment is formed by a piezoelement, is placed on the coupling component outside the measuring tube 4 in such a manner that the acoustic signals are registerable by the acoustic transducer 20. The piezoelement has, in such case, a resonance frequency that lies outside the frequencies to be evaluated. The acoustic signals are converted to corresponding electrical signals by the acoustic transducer 20. The electrical signals provided by the acoustic transducer 20 are then sent to an evaluating electronics of the vortex flow measuring device, which is indicated schematically by the cable 22 in FIG. 1.

The coupling component 18, the acoustic transducer 20 as well as the (still to be explained) sensor electronics of the vortex sensor are only schematically presented in FIG. 1. Additionally, housing components, which are provided on the outside of the measuring tube 4 for the protection of the coupling component 18, the acoustic transducer 20 as well as the sensor electronics of the vortex sensor from outer influences, are not presented in FIG. 1 for reasons of perspicuity.

The electrical signals, which are output by the acoustic transducer 20, are then, as explained above in the general part of the description, amplified and filtered to a frequency range to be evaluated. The frequency range to be evaluated comprises, for example, a region of 100 kHz to 1 MHz. Then, as explained above in the general part of the description, a measured variable to be evaluated, such as an RMS value for example, is determined from the electrical signals by the evaluating electronics. If only a detection of a particle and/or droplet flow is performed, then the evaluating electronics, for example, is embodied in such a manner that in the case of exceeding (or subceeding in given cases, i.e. falling below) a predetermined limit value of the measured variable, the presence of a particle and/or droplet flow is deduced. In given cases, the determination of a measured variable to be evaluated can also be omitted and a limit value for the signal strength of the electrical signal can be determined directly, for example. As a rule, in the case of such an exceeding (or subceeding in given cases) of the limit, a corresponding report is output to a user.

If it is supplementally desired to perform a quantitative evaluation relative to the particle and/or droplet flow, then as part of a calibration, as explained above in the general part of the description, a transfer factor ($C_1$, or $C_2$) must be determined in advance, through which the kinetic energy (transfer factor $C_1$) of individual particles and/or droplets, or through which the kinetic power (transfer factor $C_2$) of the particle and/or droplet flow is correlated with the measured variable. In such case, reference is made to the Equations (2) and (3) in the general part of the description as well as the associated descriptions. With the velocity v of the particle and/or droplet flow, which, as subsequently explained, can be ascertained by the vortex flow measuring device 2 from the vortex frequency, the mass of individual particles and/or droplets (transfer factor $C_1$), or the mass flow of the particle and/or droplet flow can then be determined (compare Equations (2) and (3)).

The vortex flow measuring device 2 additionally comprises a vortex sensor 24, which is arranged downstream from the bluff body 8. In the present example of an embodiment, the vortex sensor 24 has a paddle 26, which extends into the flow path through a bore 28, which is formed on the lowest surface element of the measuring tube 4. In such case, the paddle 26 has a rest position parallel to the bluff body 8 and is aligned with the bluff body 8. The paddle 26 can swing in a direction perpendicular to the flow direction 6 and perpendicular to the direction of elongation of the paddle 26. Accordingly, the paddle 26 moves back and forth during use due to pressure fluctuations arising, especially, due to the vortices. As explained above, the swinging movements of the paddle are transduced to an electrical measurement signal by means of a DSC sensor 30 (not illustrated in greater detail). The electrical measurement signal is then fed to an evaluating electronics of the vortex flow measuring device 2, which is schematically represented by the cable 34 in FIG. 1. The evaluating electronics determines the vortex frequency therefrom, in a manner generally known in the case of vortex flow measuring devices. In turn, the flow velocity of the first phase of a multiphase medium flowing in the pipeline and also the flow velocity v of the particle and/or droplet flow can then be determined by the evaluating electronics using the vortex frequency in known manner. This flow velocity v can then be used in Equations (2) and/or (3) for determining the mass of individual particles and/or droplets or for determining the mass flow of the particle and/or droplet flow.

In an inserted position of the vortex flow measuring device 2 illustrated in FIG. 1, the measuring tube 4 extends essentially horizontally, while the bluff body 8 extends essentially vertically, thus parallel to the direction of gravity. The paddle 26 extends from the underside of the measuring tube 4, through the measuring tube 4, into the flow path. The paddle 26 forms, in such case, a sensitive section responding to the pressure fluctuations; the sensitive section is partially arranged adjoining the tube wall of the measuring tube 4, in the lower half of the measuring tube 4. If there is a rivulet (second or third phase) such as a water rivulet, for example, in the gas, which in the present example of an embodiment forms the first phase of the multiphase flowing medium, then the rivulet collects in the lower region of the measuring tube 4 due to the force of gravity and flows directly bordering on the paddle 26. A recess 32 is supplementally embodied within the bore 28 surrounding the paddle 26; the recess 32 collects a part of the rivulet in the case of an occurrence of a rivulet. An interaction of the rivulet with the paddle 26 arises from both the rivulet flowing past the paddle 26 as well as also the collection of the rivulet within the recess 32. The measurement signal registered by the paddle 26 is influenced by this interaction. Especially, an amplitude fluctuation of the analytical signal of the measurement signal is increased. These amplitude fluctuations are also evaluated by the evaluating electronics. As explained in the general part of the description, only a detection of such a wall flow can be performed by the evaluating electronics in such case. Moreover, the evaluating electronics can also perform, however, a quantitative determination of the wall flow, as explained in the description above, especially with reference to Equations (4)-(11). The detection or quantitative determination is not explored explicitly here again.

Accordingly, both a second phase in the form of a particle and/or droplet flow as well as a second or third phase in the form of a wall flow can be detected and quantitatively determined by the vortex flow measuring device 2, wherein the particle and/or droplet flow can be of the same material as the wall flow or also a different material.

The present invention is not limited to the form of embodiment explained in reference to FIG. 1. Especially, another measured variable than the RMS value can also be taken into consideration for the detection and/or quantitative determining of the particle and/or droplet flow. Also, it is not absolutely required that a separate coupling component 18 be applied in order to conduct the acoustic signals outside of measuring tube 4. Such an acoustic coupling can also be formed in given cases even by the component, such as, for example, by the bluff body 8. Additionally, the vortex sensor 24 must not absolutely have a paddle 26 embodied separately from the bluff body 8. Especially, the vortex sensor can also be alternatively embodied within the bluff body 8. In this second variant, a blind bore, in which the vortex sensor is applied, is provided within the bluff body 8, for example parallel to the coupling component 18. In such case, this blind bore extends parallel to the bluff body 8 and has at least one passageway opening, which enables a fluid communication between the particular medium within the measuring tube and that within the blind bore. If it is also desired to register a wall flow by the vortex sensor, then preferably at least one passageway opening bordering a tube wall of the measuring tube 4 is provided. The vortex sensor arranged within the blind bore can then register pressure fluctuations, which occur in the measuring tube 4 downstream from the shedding edges 14, 16 and especially are brought about by the vortices, and transduces the registered pressure fluctuations to an electrical measurement signal through one of the variants explained above. The vortex sensor can have, for example, as explained above, a swinging sensor sleeve, whose swinging movements relative to a section decoupled from the pressure fluctuations can be registered.

FIG. 2 shows a typical measurement signal of a pure, single phase flow (here air) with superimposed disturbance fractions due to vibrations. In the lower graph of FIG. 2, the spectral power density is shown for the signal presented in part in the upper graph of FIG. 2. FIG. 2 shows that it is necessary, before an especially statistical evaluation of the measurement signal occurs, to select the frequency range V around the vortex frequency in a narrow band from the measurement signal by means of a narrow band filter, in order to be able to provide accurate information about the fraction of the second phase. In this way, it is assured that disturbance signals (e.g. disturbance signal S) do not contribute to corruption of the monitoring of the second phase, especially when the magnitude of the disturbance fractions is greater than the magnitude of the wanted signal, as is the case with small flow amounts.

The invention claimed is:

1. A vortex flow measuring device for effecting at least one of: monitoring and measuring an, at least at times, two or more phase medium flowing in a pipeline, said medium including a first phase and a second phase, said first phase exhibiting a density lower than a density of said second phase and said second phase being distributed as particles and/or droplets in the first phase, said vortex flow measuring device comprising:

at least a measuring tube, which can be inserted into a pipeline;
a bluff body;
a vortex sensor, which responds to pressure fluctuations;
an acoustic transducer; and
electronics, wherein:
said bluff body extends in said measuring tube transversely to a flow direction for providing a flow impediment adapted to enable the medium to flow past on both sides of said bluff body, and said bluff body includes at least two shedding edges for shedding Karman vortices;
said vortex sensor, in reference to an installed position, is arranged downstream from said shedding edges and, for detecting a third phase in the form of a wall flow flowing along a tube wall of said measuring tube and for transducing pressure fluctuations into an electrical measurement signal, said vortex sensor includes a sensitive section responding to pressure fluctuations, which is arranged at least partially adjoining the tube wall of said measuring tube;
said acoustic transducer is embodied integrally in a component, which protrudes into a flow path within said measuring tube, and said acoustic transducer is adapted to transduce acoustic signals produced by impact of particles and/or droplets on said component into electrical signals; and
said electronics is adapted to process said electrical measurement signal and to deduce, upon registering a measurement signal, which is characteristic for an interaction of a wall flow with said sensitive section of said vortex sensor, an existence of said third phase in said measuring tube.

2. The vortex flow measuring device as claimed in claim 1, wherein:
said component of the vortex flow measuring device includes an impingement area essentially perpendicular to the flow direction and facing the flow in an installed position of the vortex flow measuring device.

3. The vortex flow measuring device as claimed in claim 1, wherein:
said acoustic transducer is formed by a piezoelectric or capacitive transducer.

4. The vortex flow measuring device as claimed in claim 1, wherein:
said component, which protrudes into a flow path within said measuring tube, is formed by said bluff body.

5. The vortex flow measuring device as claimed in claim 1, wherein:
the electronics is adapted to evaluate electrical signals provided by said acoustic transducer according to predetermined criteria.

6. The vortex flow measuring device as claimed in claim 1, wherein:
the electronics is adapted to filter electrical signals provided by said acoustic transducer to a bandwidth to be evaluated.

7. The vortex flow measuring device as claimed in claim 1, wherein:
the electronics is adapted to determine a measured variable using a spectral signal processing of electrical signals provided by said acoustic transducer and the electronics is adapted to evaluate the measured variable based on predetermined criteria.

8. The vortex flow measuring device as claimed in claim 1, wherein:
the electronics is adapted to filter electrical signals provided by said acoustic transducer for providing filtered electrical signals to form an RMS value from values of the filtered electrical signals registered versus time and to evaluate said RMS value as a measured variable.

9. The vortex flow measuring device as claimed in claim 7, wherein:
the electronics is adapted to use a transfer factor and a velocity of the particle and/or droplet flow for determining from the measured variable at least one of: a mass flow of the second phase, a number of individual particles and/or droplets, and a mass of individual particles and/or droplets, said transfer factor being determined by a calibration and said transfer factor correlating a kinetic energy of individual particles and/or droplets, or a kinetic energy of the particle and/or droplet flow, with the measured variable.

10. The vortex flow measuring device as claimed in claim 1, wherein:
said vortex sensor is adapted to register pressure fluctuations and to transduce pressure fluctuations to an electrical measurement signal during use, and said electronics is to determine a vortex frequency from the registered pressure fluctuations and in turn to determine a flow velocity of the first phase of the multiphase medium based on the vortex frequency.

11. The vortex flow measuring device as claimed in claim 1, further comprising:
at least one diaphragm for homogenizing the particle and/or droplet flow of the second phase, said at least one diaphragm being arranged, relative to the flow direction, before said component of the vortex flow measuring device.

12. The vortex flow measuring device as claimed in claim 1, wherein:
the first phase is gaseous.

13. The vortex flow measuring device as claimed in claim 1, wherein:
the electronics is adapted to filter electrical signals registered by said vortex sensor for providing a measurement signal,
which is characteristic of an interaction of third phase with said sensitive section of said vortex sensor.

14. The vortex flow measuring device as claimed in claim 1, wherein the electronics is adapted:
to determine from the measurement signal provided by said vortex sensor a vortex frequency and a statistical variable, which is a measure of fluctuations of a amplitude of the measurement signal and
to determine, with reference to a correlation, from said vortex frequency and said statistical variable a mass flow of the second phase, said correlation setting in relationship to one another:
different known mass flows of said second phase of medium, vortex frequencies determined from the measurement signal for different flow velocities of the first phase of the multiphase medium, and associated determined values of the statistical variable.

15. Using the vortex flow measuring device as claimed in claim 1 for monitoring and/or measuring an, at least at times, two or more phase medium flowing in a pipeline.

16. The vortex flow measuring device as claimed in claim 1, wherein:
the electronics is adapted to determine a measured variable using a statistical evaluation of electrical signals provided by said acoustic transducer and the electronics is adapted to evaluate the measured variable based on predetermined criteria.

17. The vortex flow measuring device as claimed in claim 1, wherein the electronics is adapted:
to filter the electrical signals registered by said vortex sensor for providing a measurement signal with an amplitude exhibiting fluctuations, which are increased compared to fluctuations of an amplitude of said measurement signal provided by said by said vortex sensor for a pure, single phase medium, and to use said fluctuations for deducing the existence of said third phase in said measuring tube.

18. The vortex flow measuring device as claimed in claim 1, wherein:
the electronics is adapted to use the electrical signals provided by said acoustic transducer, for determining at least one of: a number of individual particles and/or droplets of said second phase, a mass of individual particles and/or droplets of said second phase, and a mass flow of said second phase.

19. The vortex flow measuring device as claimed in claim 1, wherein:
the electronics is adapted to use the measurement signal provided by said vortex sensor, for determining a mass flow of the third phase.

20. The vortex flow measuring device as claimed in claim 12, wherein the third phase forms a rivulet.

21. A vortex flow measuring device for effecting at least one of: monitoring and measuring an, at least at times, two or more phase medium flowing in a pipeline, said medium including a first phase and a second phase, said first phase exhibiting a density lower than a density of said second phase and said second phase being distributed as particles and/or droplets in the first phase, said vortex flow measuring device comprising:

at least a measuring tube, which can be inserted into a pipeline;

a bluff body;

a vortex sensor, which responds to pressure fluctuations;

an acoustic transducer; and an electronics; wherein:

the bluff body extends in said measuring tube transversely to a flow direction for providing a flow impediment adapted to enable the medium to flow past on both sides of the bluff body, and said bluff body includes at least two shedding edges for shedding Karman vortices, the vortex sensor, in reference to an installed position, is arranged downstream from said shedding edges and, for detecting a third phase in the form of a wall flow flowing along a tube wall of said measuring tube and for transducing pressure fluctuations into an electrical measurement signal, said vortex sensor includes a sensitive section responding to pressure fluctuations, which is arranged at least partially adjoining the tube wall of said measuring tube, the acoustic transducer is acoustically coupled to a component, which protrudes into a flow path within said measuring tube, and said acoustic transducer is adapted to transduce acoustic signals produced by impact of particles and/or droplets on said component into electrical signals, and the electronics is adapted: to process said electrical measurement signal and to deduce, upon registering a measurement signal, which is characteristic for an interaction of a wall flow with said sensitive section of said vortex sensor, an existence of said third phase in said measuring tube.

22. The vortex flow measuring device as claimed in claim 21, wherein:

the electronics is adapted to use the electrical signals provided by said acoustic transducer, for determining at least one of: a number of individual particles and/or droplets of said second phase, a mass of individual particles and/or droplets of said second phase, and a mass flow of said second phase.

23. The vortex flow measuring device as claimed in claim 21, wherein:

the electronics is adapted to use the measurement signal provided by said vortex sensor for determining a mass flow of the third phase.

24. The vortex flow measuring device as claimed in claim 21, wherein:

said acoustic transducer is arranged outside said measuring tube and is acoustically coupled to said component, which protrudes into a flow path within said measuring tube.

25. The vortex flow measuring device as claimed in claim 21, wherein:

said component, which protrudes into a flow path within said measuring tube, is formed by said bluff body.

* * * * *